Nov. 4, 1941.     J. H. G. HORSTMANN     2,261,881
SUN VISOR FOR VEHICLES
Filed Jan. 22, 1941
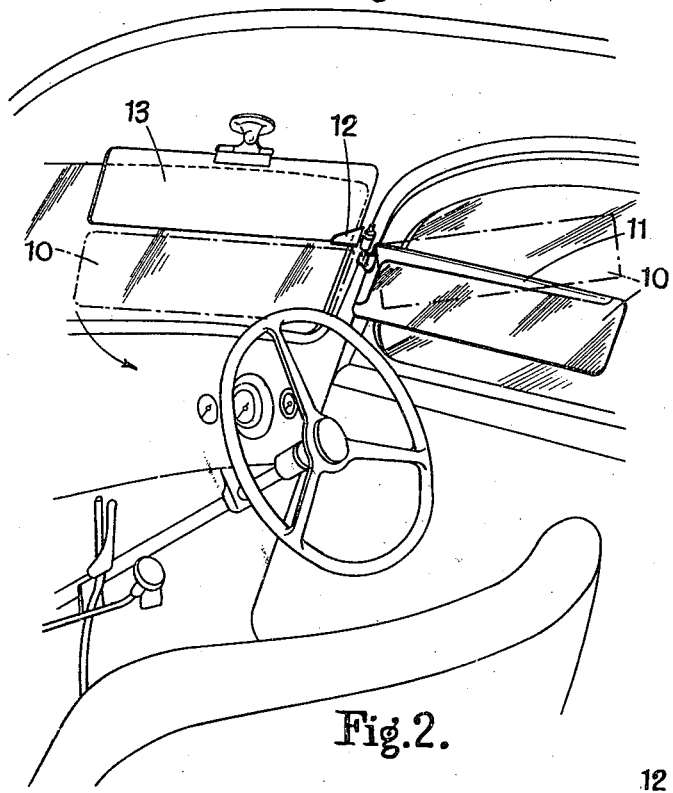
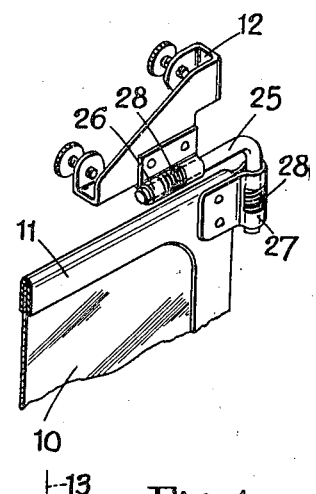
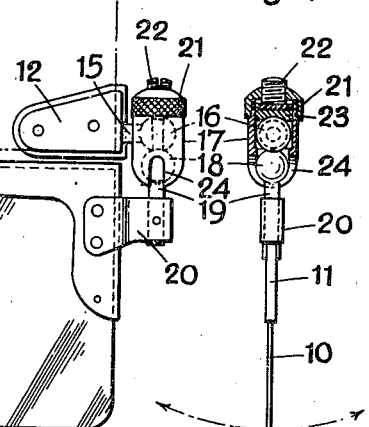
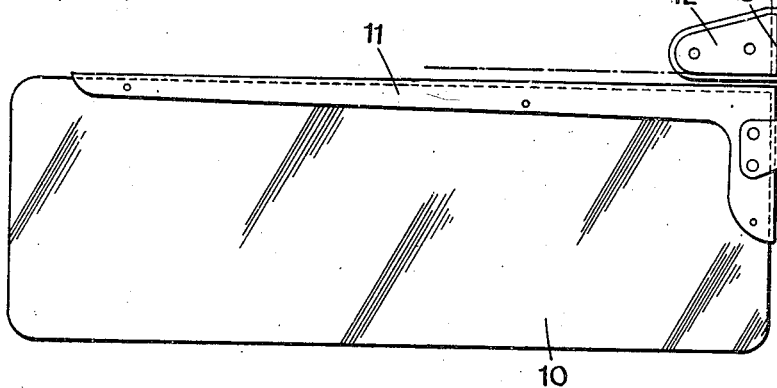
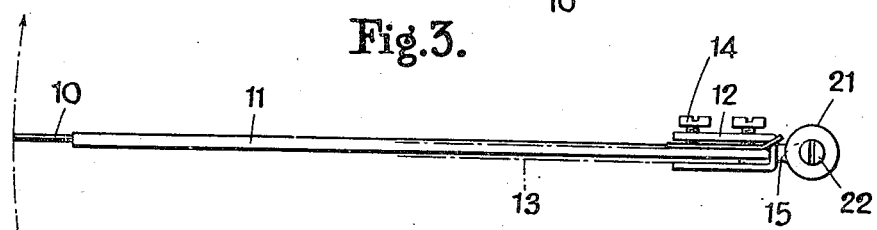
INVENTOR
JOHN H. G. HORSTMANN
By Wechsler & Groff Attys Patented Nov. 4, 1941

2,261,881

UNITED STATES PATENT OFFICE 2,261,881

SUN VISOR FOR VEHICLES

John Hermann Gustav Horstmann, Wellow, Somerset, England

Application January 22, 1941, Serial No. 375,523
In Great Britain June 16, 1939

2 Claims. (Cl. 296—97)

This invention relates to shields as employed particularly on motor cars and other vehicles to protect the eyes of the driver from the glare of the sun and artificial light, generally termed sun visors.

The ordinary opaque shield used on motor cars are sometimes ineffective, notably when the sun is low in the sky, in preventing the sun's rays from impinging directly on the eyes of the driver.

For this reason it has been proposed to provide an auxiliary panel which is adapted at its upper horizontal edge to be fitted to the lower horizontal edge of the main panel in such a manner that it can be moved from a position in which it overlies the main panel to a position in which it constitutes a downward extension thereof, the auxiliary panel either sliding over the main panel, or being moved angularly about the said horizontal edges. In any event the range of positions through which the auxiliary panel can be adpusted is comparatively unlimited.

The present invention has for its object to provide an auxiliary panel for a sun or glare shield which is constructed in such a manner that the auxiliary panel may be moved into a great variety of positions, either as a downward extension of the main panel at requisite angles, or as a lateral extension also at any requisite angle.

According to the invention there is provided for use on a motor car or other vehicle a sun visor in which there is provided in conjunction with a main visor or as an attachment therefor, an auxiliary visor comprising a panel which is fitted with means for connecting it to the main visor, said means comprising a joint of a universal nature which enables the panel to be moved relatively to the main visor so as to be capable of assuming a position for use in which said auxiliary visor forms a bottom extension at any suitable angle to the main visor and also to be moved so as to be capable also of assuming an alternative position in which it extends laterally therefrom at any suitable angle (so that it obstructs glare entering the vehicle through the adjacent side window) and which is adapted also to assume an inoperative position in which it lies superimposed on the main visor.

The auxiliary visor is made of transparent or translucent material and when disposed in relation to the main portion to form a bottom extension thereto it provides an additional protective area which in conjunction with the protection afforded by the main portion prevents the sun's rays from impinging directly on the driver's eyes whilst the view ahead is not obstructed thereby.

The auxiliary visor may be suitably coloured to reduce the glare from the sun or other rays and may be made of a non-inflammable cellulosic material, non-splinterable or toughened glass, or other suitable material.

In the case where the complete visor is manufactured to comprise a main visor and auxiliary visor, the main visor will be of such a size that it can be readily disposed in the operative and inoperative positions without obstruction from the adjacent parts of the vehicle whilst when made of opaque material it will not at any time completely block out the field of view. The main visor may, however, be made of material similar to that used for the auxiliary visor.

If the auxiliary visor consists of a member normally separate from the main portion, mounting means, such as a clip, may be provided for securing the auxiliary visor on and in any desired position in relation to the main visor to enlarge the effective area of protection afforded thereby, the clip supporting the said joint of a universal nature.

The accompanying drawing illustrates two embodiments of the invention, in each of which the auxiliary visor is detachably connected to the main visor. In the drawing:

Figure 1 is a fragmentary view of the interior of a motor car showing the manner in which the auxiliary visor is mounted on the main visor;

Figure 2 is an elevation of the auxiliary visor showing the manner in which same is supported according to one embodiment of the invention;

Figure 3 is a plan view of Figure 2;

Figure 4 is a side view of Figure 2 showing the auxiliary screen supporting device in section; and Figure 5 is a fragmentary perspective view showing another manner of mounting the auxiliary screen.

Referring firstly to Figures 1 to 4, the auxiliary visor comprises a translucent or coloured transparent plate 10 which is partially framed by an L-shaped frame member 11.

A channel-like clip or bracket 12 adapted to receive and fit upon a bottom corner of the main visor 13 is provided with clamping screws 14 adapted to effect firm anchorage on said main visor, and carries a rigidly extending shank 15 on the outer end of which is formed a ball 16. Said ball 16 is located within and serves to carry a cylindrical housing 17, said housing also accommodating in its contracted lower end a second ball 18 which is in contact with the ball 16. Said ball 18 is solid with a shank 19 which is secured in a lug 20 projecting from the end of the auxiliary visor and fixed to the frame member 11.

The tubular housing 17 is provided at its open upper end with a screw-on cap 21 into which is screwed a set screw 22 which serves to exert pressure on to a disc 23 whereby the housing components have frictional engagement with the balls 16 and 18, the balls 16 and 18 being also thus caused frictionally to engage one another.

A slot 24 formed in the contracted lower end of the housing 17 can be traversed by the ball-shank 19 to enable the auxiliary visor to be swung in backward and forward direction with respect to the housing 17. Also the said ball shank 19 is able to turn about its axis to permit the auxiliary visor to be swung out horizontally to provide a shield for a side or door window as shown in Figure 1. The combination of the two balls 16 and 18 permit a great variety of movements of the auxiliary screen 10 in relation to the main visor 13.

The tubular housing 17 is permitted rotational movement about the ball shank 15 and this enables the auxiliary visor 10 to be swung upwardly to lie alongside the main visor 13 in superimposed relation thereto, the auxiliary visor being thus accommodated when out of use within the area dimensions of the main visor. The friction pressure due to the set screw 22 will hold the auxiliary visor in any position to which it is set.

In Figure 1 three only of the great variety of positions which can be assumed by the auxiliary visor have been indicated, full lines showing one side arrangement, the broken-line position thereabove indicating another side arrangement particularly useful when the sun is low on the driver's offside, and the other broken-line position showing both visors in frontal and vertical continuation.

The mounting device for the auxiliary visor shown in Figure 5 embodies an L-shaped member 25 formed from metal rod, the limbs of which are rotatably mounted respectively in a tubular socket 26 fixed to the bracket 12 and a similar socket 27 fixed in the auxiliary visor frame 11. Said sockets 26, 27 are formed with gaps in which are fitted coiled springs 28 which exert frictional grip on the limbs of the L-shaped member to hold same in set position. As will be readily understood, the directions of angular movement available to the auxiliary visor when carried by said L-shaped member, correspond with those obtainable as above described with reference to Figures 2, 3 and 4.

In the case where there is provided a visor comprising a main visor and an auxiliary visor permanently carried thereby, the bracket 12 may be constituted by a frame component of the main panel. The main panel will be attached to the vehicle body structure in any usual manner.

Although the auxiliary visor and also the main visor (where both are provided in a compound visor) preferably are each in the form of a flat panel, same may be suitably curved if so desired.

It will be appreciated that the improved shield is also advantageous at night time in providing for protection of the driver's eyes against the glare of oncoming head lights.

I claim:

1. A sun visor for vehicles comprising a main visor and an auxiliary visor, a horizontal shank carried by one of said visors and extending from one end thereof, said shank being disposed in a plane substantially parallel to the plane of the visor by which it is carried, a vertical shank carried by the other visor at one end thereof and disposed in a plane substantially parallel to the plane of the said other visor, a housing having a slotted and otherwise closed end, said vertical shank extending through said slot and having a substantially spherical head seated against the closed end portion of said housing, said horizontal shank extending through the side of said housing and having a head within said housing against which the head of said vertical shank is seated, whereby the auxiliary visor is swingably adjustable to various different positions relative to said main visor, and means carried by said housing and reacting from the head on said vertical shank to maintain the heads of said shanks in frictional engagement with each other and the head of said vertical shank in frictional engagement with the closed end portion of said housing, whereby the auxiliary visor is held in any position of adjustment thereof relative to the main visor.

2. A sun visor for vehicles comprising a main visor, a horizontal shank carried by said main visor and extending from one end thereof near the bottom thereof and disposed in a plane substantially parallel to the plane of said main visor, a cylindrical housing slotted and otherwise closed at its lower end, said shank extending through the side of said housing and having a head disposed in said housing, an auxiliary visor, a vertically disposed shank carried by said auxiliary visor at one end and near the top thereof, said housing having a slotted and otherwise closed lower end, said slot being disposed in a plane at substantially right angles to the plane of the main visor, said vertical shank extending through said slot and having a substantially spherical head seated against the closed lower end portion of said housing and against the head of said horizontal shank, and means carried by said housing and reacting from the head of said horizontal shank to urge the heads of said shanks against each other and the head of said vertical shank against the closed lower end portion of said housing, whereby the auxiliary visor is adjustable to various different positions relative to the main visor and is frictionally held in any adjusted position thereof.

JOHN HERMANN GUSTAV HORSTMANN.